US008812538B2

(12) United States Patent
Muzatko

(10) Patent No.: US 8,812,538 B2
(45) Date of Patent: Aug. 19, 2014

(54) STORY GENERATION METHODS, STORY GENERATION APPARATUSES, AND ARTICLES OF MANUFACTURE

(76) Inventor: Wendy Muzatko, Spokane, WA (US)

(*) Notice: Subject to any disclaimer, the term of this patent is extended or adjusted under 35 U.S.C. 154(b) by 697 days.

(21) Appl. No.: 12/785,270

(22) Filed: May 21, 2010

(65) Prior Publication Data
US 2011/0191368 A1    Aug. 4, 2011

Related U.S. Application Data

(60) Provisional application No. 61/299,510, filed on Jan. 29, 2010.

(51) Int. Cl.
G06F 17/30    (2006.01)
G06F 7/00     (2006.01)

(52) U.S. Cl.
USPC .......................................... 707/769; 715/211

(58) Field of Classification Search
USPC .......................................... 707/769; 715/211
See application file for complete search history.

(56) References Cited

U.S. PATENT DOCUMENTS

| | | | |
|---|---|---|---|
| 5,035,624 A | 7/1991 | Hosoya et al. | |
| 5,065,345 A | 11/1991 | Knowles et al. | |
| 5,214,758 A | 5/1993 | Ohba et al. | |
| 6,084,590 A | 7/2000 | Robotham et al. | |
| 6,108,001 A | 8/2000 | Tuttle | |
| 6,121,963 A | 9/2000 | Ange | |
| 6,369,835 B1 | 4/2002 | Lin | |
| 6,469,711 B2 | 10/2002 | Foreman et al. | |
| 6,597,375 B1 | 7/2003 | Yawitz | |
| 6,624,826 B1 | 9/2003 | Balabanovic | |
| 6,628,303 B1 | 9/2003 | Foreman et al. | |
| 6,642,918 B2 | 11/2003 | Uchida et al. | |
| 6,665,835 B1 | 12/2003 | Gutfreund et al. | |
| 6,694,482 B1 | 2/2004 | Arellano et al. | |
| 6,803,925 B2 | 10/2004 | Vronay | |
| 6,914,975 B2 | 7/2005 | Koehler et al. | |
| 7,073,127 B2 | 7/2006 | Zhao et al. | |
| 7,139,977 B1 | 11/2006 | Russell | |
| 7,155,158 B1 | 12/2006 | Iuppa et al. | |
| 7,246,315 B1 | 7/2007 | Andrieu et al. | |
| 7,272,779 B2 | 9/2007 | Deshpande | |
| 7,372,536 B2 | 5/2008 | Shah et al. | |
| 7,400,351 B2 | 7/2008 | Zhang et al. | |
| 7,437,002 B2 * | 10/2008 | Tanaka | 382/199 |
| 7,458,029 B2 | 11/2008 | Agrawala et al. | |
| 7,505,062 B2 | 3/2009 | Davidson et al. | |
| 7,512,622 B2 | 3/2009 | Volk et al. | |
| 7,552,228 B2 | 6/2009 | Parasnis et al. | |
| 7,636,733 B1 | 12/2009 | Rothmuller | |
| 7,652,694 B2 * | 1/2010 | Suto | 348/239 |
| 2002/0178184 A1 | 11/2002 | Kuchinsky et al. | |

(Continued)

Primary Examiner — Pavan Mamillapalli
(74) Attorney, Agent, or Firm — Wells St. John P.S.

(57) ABSTRACT

Story generation methods, story generation apparatuses, and articles of manufacture are described. According to one aspect, a story generation method includes displaying a user interface which is configured to assist a user with writing a story; accessing a plurality of words of the story inputted by the user interacting with the user interface; using at least one of the words of the story, selecting one of a plurality of different graphical images which corresponds to the at least one word of the story; and generating a plurality of pages of the story which include the words of the story, and wherein at least one of the pages includes the one graphical image which corresponds to the at least one word of the story.

10 Claims, 6 Drawing Sheets

(56) References Cited

U.S. PATENT DOCUMENTS

| | | |
|---|---|---|
| 2002/0178185 A1 | 11/2002 | Kuchinsky et al. |
| 2002/0198716 A1* | 12/2002 | Zimmerman ................ 704/270 |
| 2004/0117728 A1* | 6/2004 | Gromer ........................ 715/500 |
| 2004/0255251 A1 | 12/2004 | Vronay |
| 2005/0047660 A1* | 3/2005 | Tanaka ......................... 382/176 |
| 2006/0135256 A1* | 6/2006 | Toyama ......................... 463/31 |
| 2006/0248086 A1* | 11/2006 | Pahud ............................. 707/10 |
| 2007/0133940 A1 | 6/2007 | Freeman |
| 2008/0256066 A1* | 10/2008 | Zuckerman et al. .............. 707/5 |

* cited by examiner

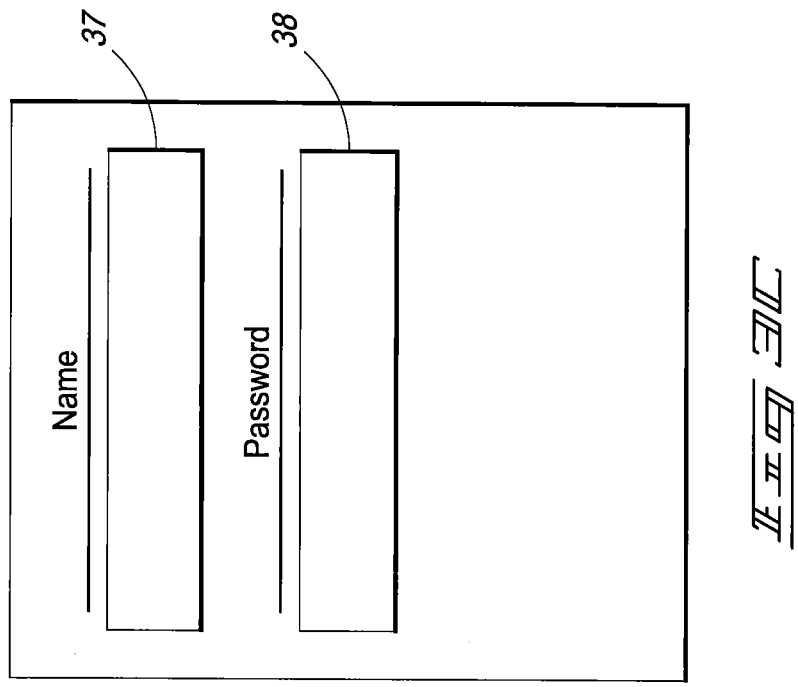
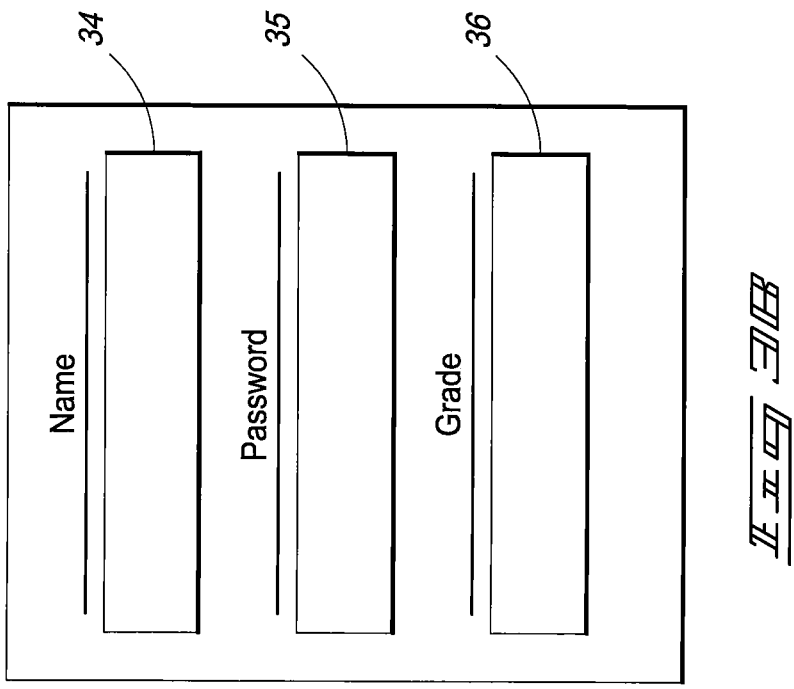

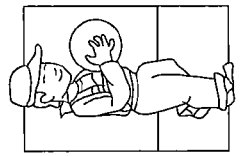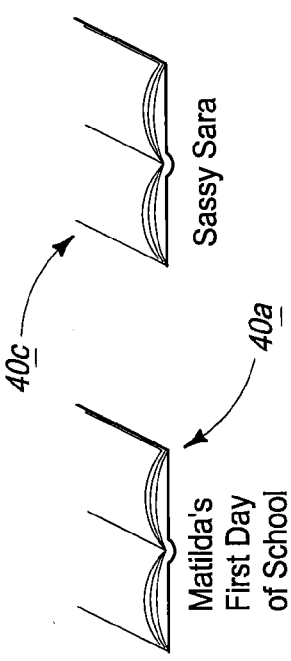
FIG. 3E
FIG. 3D

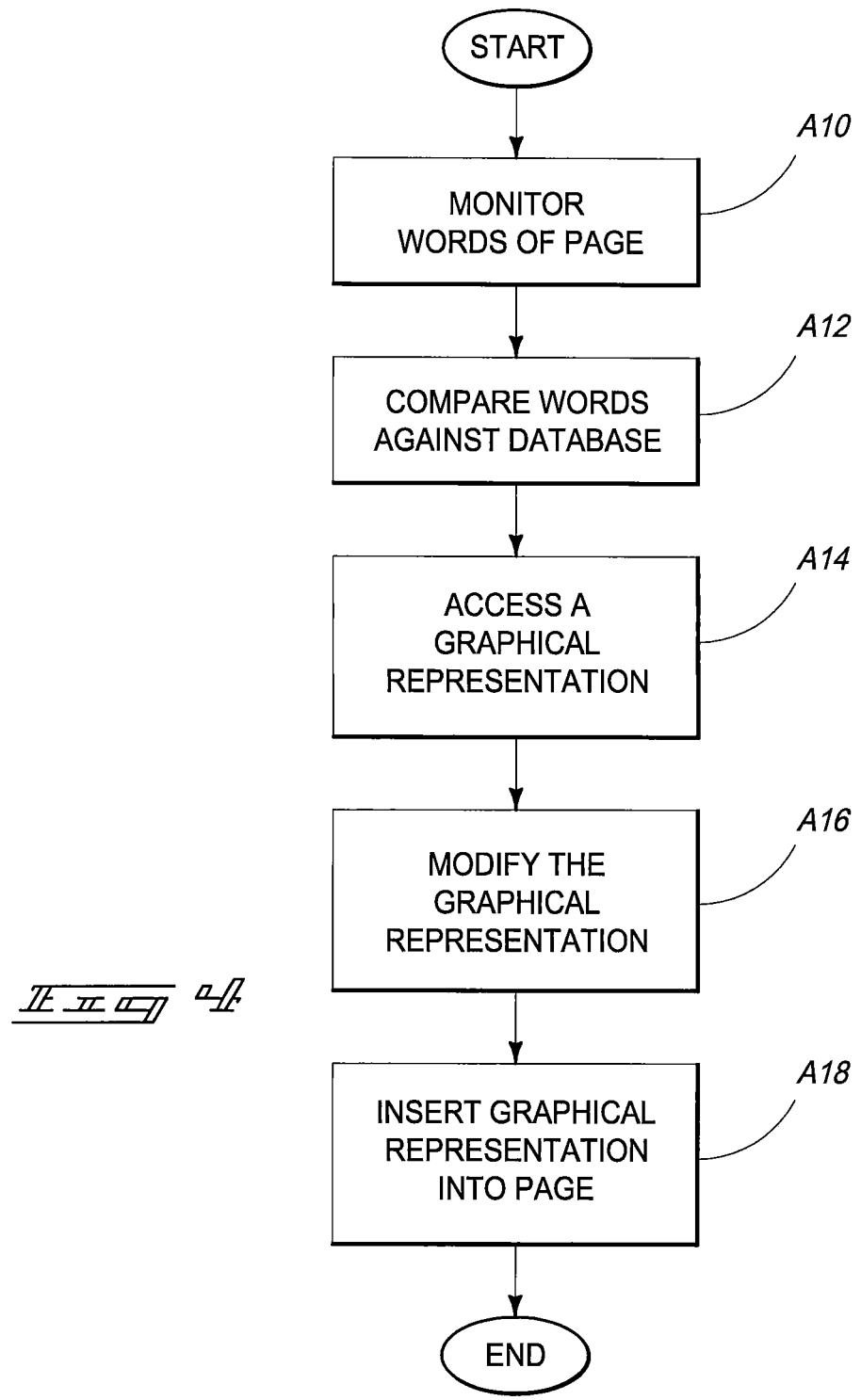

STORY GENERATION METHODS, STORY GENERATION APPARATUSES, AND ARTICLES OF MANUFACTURE

CROSS REFERENCE TO RELATED APPLICATION

This application claims the benefit of U.S. Provisional Application Ser. No. 61/299,510 filed Jan. 29, 2010, which is incorporated herein by reference in its entirety.

TECHNICAL FIELD

This disclosure relates to story generation methods, story generation apparatuses, and articles of manufacture.

BACKGROUND OF THE DISCLOSURE

Computers have evolved significantly in processing capability and speed. Furthermore, peripheral components are available to expand the applications and functions of the computers. Computers are ubiquitous in the workplace, schools and entertainment. Recently, some computing devices have been introduced which have increased portability over conventional desktop computers and laptop computers and provide other functionalities (e.g., music devices, smart phones, etc.).

Accordingly, it is desired to teach students how to use and interact with computers including educating the students how to perform basic operations with respect to computers. It is also advantageous to introduce children to computers at relatively young ages to provide the children with familiarity of operating computing systems and interaction with computing environments. In addition, computers are also useful to educate students in other subjects such as reading, writing, math, science, etc.

At least some aspects of the disclosure are directed towards methods, apparatus and articles of manufacture for assisting children with learning to operate computing systems as well as providing additional educational experiences to the children including assistance with story writing.

BRIEF DESCRIPTION OF THE DRAWINGS

Exemplary embodiments of the disclosure are described below with reference to the following accompanying drawings.

FIGS. 3A-3G are screens of a user interface which are displayed to assist a user with writing a story according to one embodiment.

FIG. 4 is a flow chart of a method of generating a graphical image to be included in a story using inputted words of the story according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

According to one embodiment, a story generation method comprises displaying a user interface which is configured to assist a user with writing a story; accessing a plurality of words of the story inputted by the user interacting with the user interface; using at least one of the words of the story, selecting one of a plurality of different graphical images which corresponds to the at least one word of the story; and generating a plurality of pages of the story which include the words of the story, and wherein at least one of the pages includes the one graphical image which corresponds to the at least one word of the story.

According to an additional embodiment, a story generation apparatus comprises a display configured to depict an interactive user interface which is configured to assist a user with writing a story; and processing circuitry coupled with the display and configured to access a plurality of user inputs of a user interacting with the user interface and wherein the user inputs comprise a plurality of words of the story which is being written by the user, to generate a graphical image which corresponds to one of the words, and to generate a plurality of pages of the story which include the words of the user inputs, wherein at least one of the pages includes the graphical image.

According to another embodiment, an article of manufacture comprises at least one computer-readable storage medium comprising programming stored thereon that is configured to cause processing circuitry to perform processing comprising controlling a display to depict an interactive user interface which is configured to assist a user with writing a story; accessing a plurality of user inputs of a user interacting with the user interface, wherein the user inputs comprise textual content of a plurality of pages of the story being written by the user; using the textual content, selecting a graphical image which corresponds to the textual context; and generating the pages of the story to include the textual content, and wherein at least one the pages includes the graphical image.

At least some aspects of the disclosure are directed towards education of children including the provision of a computing environment which may be used by the children. In one example, a computing environment is provided which assists children with additional education topics including story writing. As described in further detail below according to one embodiment, a child may input words of a story into a computing device and the computing device may automatically generate graphical images which correspond to content of the words which were inputted by the child and without specific inputs which instruct the computing system to generate the graphical images.

Figure 1:
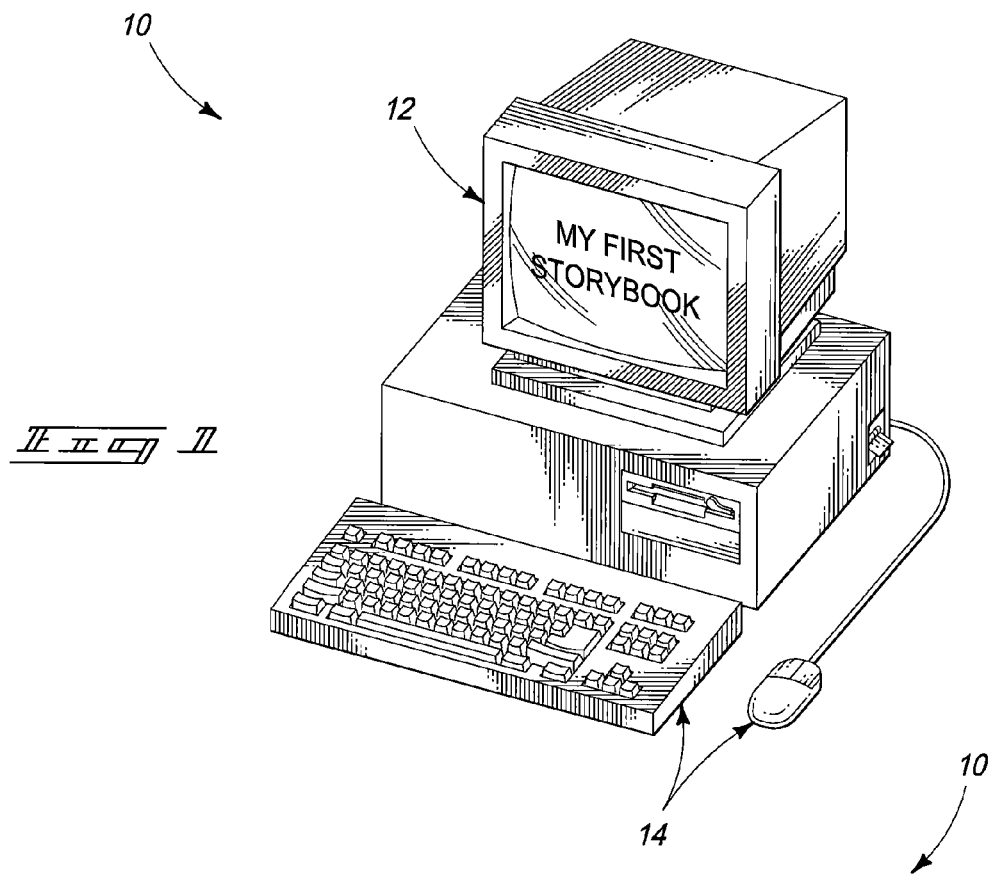
FIG. 1 is an illustrative representation of a story generation apparatus according to one embodiment.

Referring to FIG. 1, one example of a story generation apparatus 10 is shown. The story generation apparatus 10 may be implemented as a computing device which is configured to depict images and process user inputs. Example computing devices which may be used include personal computers, notebook computers, smart phones, etc.

In the example arrangement illustrated in FIG. 1, the story generation apparatus 10 is implemented as a personal computer and includes a display 12 and a plurality of user input devices 14 including a keyboard and a pointing device, such as a mouse. Other arrangements of story generation apparatus 10 are possible.

As described in further detail below, the story generation apparatus 10 is configured to depict images of a user interface and to access and process user inputs, for example, resulting from users (e.g., children and teachers) interacting with the user interface in one embodiment. In one example, a child may input words as they write a story and the story generation apparatus 10 creates a work (e.g., book) of the story using the inputted words. Furthermore, the apparatus 10 may create the work which includes a plurality of images which were generated by the apparatus 10 and which correspond to the content of the words.

Figure 2:
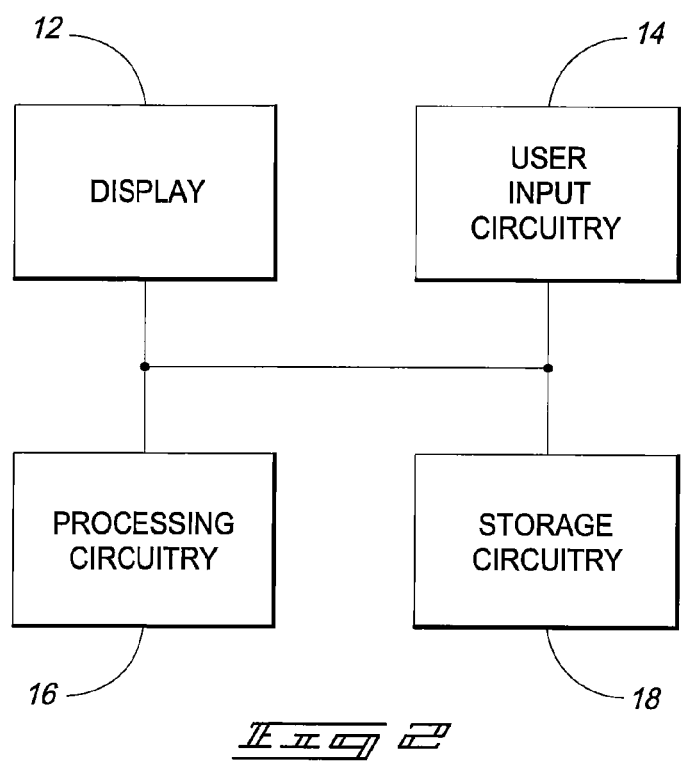
FIG. 2 is a functional block diagram of a story generation apparatus according to one embodiment.

Referring to FIG. 2, components of one embodiment of the story generation apparatus 10 are shown. The illustrated example of the story generation apparatus 10 includes a display 12, one or more user input device(s) 14, processing circuitry 16 and storage circuitry 18. Other configurations are possible including more, less and/or alternative components.

Display 12 is configured to depict visual images for observation by the user. The display 12 is configured to depict images of a graphical user interface (GUI) which users may interact with in one embodiment. Example screens of the graphical user interface which are generated in one example arrangement are discussed below with respect to FIGS. 3A-3G.

User input devices 14 are utilized by users to interact with story generation apparatus 10. In one embodiment, user input devices 14 include a pointing device and keyboard as mentioned above.

Processing circuitry 16 is arranged to process data, control data access and storage, issue commands, and control other desired operations. Processing circuitry 16 may comprise circuitry configured to implement desired programming provided by appropriate computer-readable storage media in at least one embodiment. For example, the processing circuitry 16 may be implemented as one or more processor(s) and/or other structure configured to execute executable instructions including, for example, software and/or firmware instructions. Other exemplary embodiments of processing circuitry 16 include hardware logic, PGA, FPGA, ASIC, state machines, and/or other structures alone or in combination with one or moreprocessor(s). These examples of processing circuitry 16 are for illustration and other configurations are possible.

Storage circuitry 18 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 18 and configured to control appropriate processing circuitry 16.

The computer-readable storage medium may be embodied in one or more articles of manufacture which can contain, store, or maintain programming, data and/or digital information for use by or in connection with an instruction execution system including processing circuitry 16 in the exemplary embodiment. For example, exemplary computer-readable storage media may include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Referring to FIGS. 3A-3G, a plurality of screens are depicted according to example embodiments of the disclosure and the screens are discussed in further detail below with respect to example user interactions with the screens.

Figure 3A:
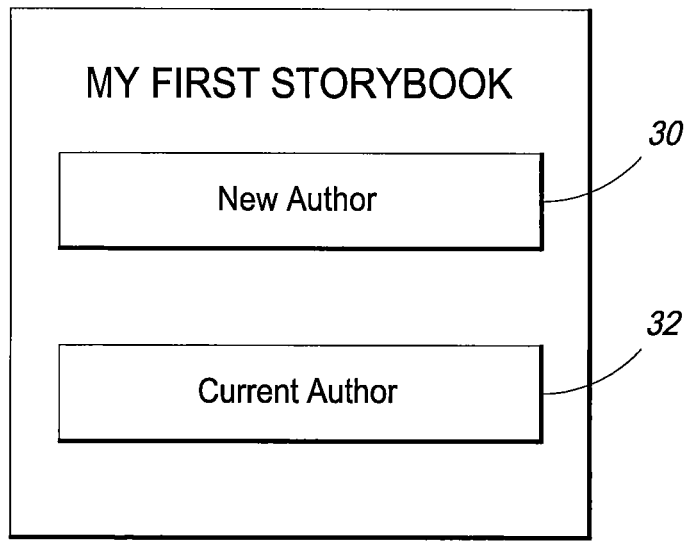

FIG. 3A shows one screen which may be presented to a user at the start of an interactive session with the story generation apparatus 10. The illustrated example screen includes a graphical user interface comprising a new author button 30 and a current author button 32. In one embodiment, apparatus 10 may implement secured operations and users may be required to present authentication information (e.g., username and password) prior to gaining access to an application which performs story generation operations. The user may be instructed to pick a new password if their submitted password is not unique.

If the user has not previously accessed the story generation application, then the user selects new author button 30 which results in the generation of the screen of FIG. 3B where the user is requested to set-up a personal profile/account in one embodiment. The user is requested to provide their username, password and grade in respective boxes 34, 35, 36 and a profile/account for the user is established. Once the user has appropriately arranged their profile/account, the user may be directed to one or more other screens to start with the creation of a story. In one embodiment, the user may be directed to the screen of FIG. 3E discussed below where they can define a character of the story.

If the user has already set up a profile/account, the user selects the current author button 32 of FIG. 3A which results in the generation of the screen of FIG. 3C where the user is requested to provide their username and password in respective boxes 37, 38 and logs the user into their profile/account.

The screen of FIG. 3D may be presented to a logged-in user if the user already has an existing profile/account with the apparatus 10. More specifically, after the user has logged-in via the screen of FIG. 3C, the apparatus 10 may present the screen of FIG. 3D which includes a plurality of icons 40a, 40b, 40c which correspond to previously-stored works in the account of the user (and perhaps which were previously authored by the user). Once a user has started to create a story, the user may save the story in a database of the apparatus 10 and the user may thereafter access the stories stored in the database and revise the stories, add additional material to the stories, etc.

In the example screen of FIG. 3D, the user has three stories in their account including Matilda's First Day of School 40a, Max the Cat 40b, and Sassy Sara 40c. If the user selects one of the icons, 40a, 40b, 40c, the story is retrieved from the database and the user can continue to work on the story including adding new subject matter content and/or revising previously entered subject matter content.

Alternatively, the user may wish to create a new story and the user may provide an appropriate input to the apparatus 10 indicating that they wish to create a new work. Apparatus 10 may thereafter present the screen of FIG. 3F to a user for use in creation of a title of their new story in one embodiment.

Figure 3E:
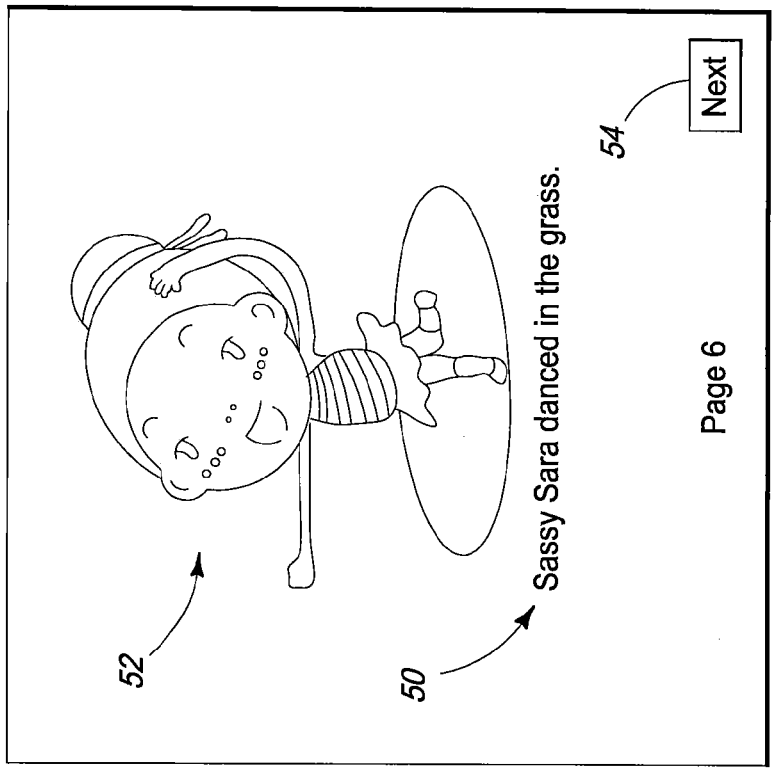

The screen of FIG. 3E is an example screen which may be presented to a user to assist a user with the generation of a character. The screen of FIG. 3E may be presented to the user after they input a title via the screen of FIG. 3F, the user types in a name of a character during the writing of the story which is unrecognized by the apparatus 10, or the user otherwise provides an indication that they wish to create a character.

Users may create more than one character per story in one embodiment. For example, the user may use a plurality of screens of FIG. 3E to create a main character and a plurality of additional characters. Example characters include people, animals or fictional beings. As mentioned above, this screen may be presented after a user indicates a desire to start a new story, the user indicates a desire to create a new character for a story they are working on or in any other situations where the user wishes to create another character for their story. The processing circuitry may also monitor for a name inputted by the user which does not have an existing character in the story by comparing inputted words next to a database which includes common names. If the processing circuitry detects an inputted name which does not have a corresponding character which has already been created, the apparatus may request whether the user wishes to generate a new character, for example using the screen of FIG. 3E. If the user indicates they do not wish to create the character for the inputted name, the apparatus 10 may prevent the user from using that name in the story in one configuration.

The screen of FIG. 3E presented by the apparatus 10 includes a plurality of queries 42 to assist the user with creating their character. The user may specify a name of their character, sex of their character, whether their character is a person or animal, and other characteristics of the character (e.g., tall or short, color of clothes, color of hair, skinny or round, etc.) by typing in responses to the queries 42 of the screen in one embodiment. Furthermore, additional queries 42 may be provided (by a teacher) regarding other characteristics which may be defined by the user or an additional box may also be provided where the user may specify other desired characteristics of their character.

In one embodiment, the illustrated screen also includes a graphical image 44 of the character. The graphical image 44 is presented and characteristics of the graphical image 44 are shown as they are defined by the user in the illustrated arrangement.

In one more specific embodiment, the processing circuitry of the apparatus accesses the responses of the user to the queries 42 and uses the responses to generate the graphical image 44. The storage circuitry of the apparatus may include a plurality of pre-existing graphical images of different characters (e.g., boys, girls, animals, etc.) and the processing circuitry of apparatus may use the words to search the stored graphical images to select an image which corresponds to the inputted text. For example, as the user defines the sex of the character, the graphical image 44 may include a pre-existing figure of a boy or girl as specified by the user.

Additional characteristics may be added to the graphical image 44 as the user defines the additional characteristics (e.g., tall/short, clothes color, hair color, holding a type of ball, etc.). If desired, the user may make changes to the graphical image 44. In one embodiment, the user may revise previously selected characteristics (e.g., by changing their responses to the queries 42 in one example) after reviewing the graphical image 44 of the character. The graphical image 44 changes as the responses to the queries 42 are changed which provides immediate visual feedback to the user of the changes upon the graphical image 44.

After the user is satisfied with the appearance of their character, the user may save the character and continue to generate the story including, for example, defining additional characters using the screen of FIG. 3E or moving to other screens to input text for their story as described below.

In one embodiment, the name of the character may be associated with the graphical image 44 of the character and used for subsequent searching during story generation operations. For example, the graphical image 44 of the character may be stored as an entry of the database and the name of the character may be used as a search term for the entry which is subsequently compared against words of the story inputted by the user as the user writes the story as described in further detail below. After its creation, the graphical image 44 may be associated with text of the story being written by the user as described in additional detail below in one embodiment of the disclosure.

Figure 3F:
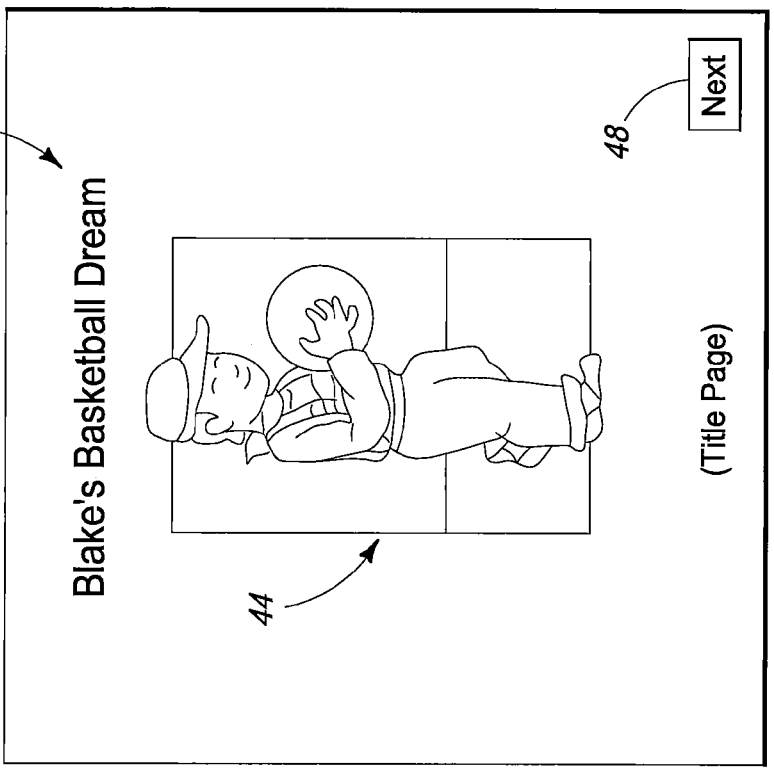

The screen of FIG. 3F may be presented to a user after the user has created their character or if the user indicates a desire to create or modify a title page. The user may input words to be the title of the story they are writing via the graphical user interface and the inputted words 46 may appear on the title page in one embodiment. In another possible embodiment, the apparatus 10 may suggest a title based upon the user's responses to queries 42 from screen FIG. 3E and a user may select, modify or reject the suggested title. Instructions may be provided by the apparatus 10 which request that the user insert the title of their story.

In one implementation, the processing circuitry may automatically without user input insert the graphical image 44 of a character into the title page if the character's name appears in the title as written by the user. In another embodiment, the user may select a previously-defined graphical image 44 of a character for inclusion as an image on the title page. In another embodiment, the title of the story may be inputted or generated after the pages of the story are written.

The screen of FIG. 3F also includes a "next" button 48 which a user may select once they are satisfied with the title page and the user wishes to proceed with further development of their story. Once a title is defined for a story, the title may be associated with an icon which includes the title and the icon may be presented via the screen of FIG. 3D when the user subsequently logs-in to the apparatus.

The screen of FIG. 3G may be depicted after a user has created the title of the story or otherwise wishes to add or modify content to an existing story. In one embodiment, the screen of FIG. 3G is used to create a page of the story which may include textual and graphical content.

In one embodiment, a user may input textual content 50 in the form of a plurality of words which will be text of a page of the story. Instructions may be provided by the apparatus 10 which request that the user insert begin writing their story. The processing circuitry of the apparatus accesses and processes the words 50 inputted by the user. In one embodiment, the words may be compared with entries of stored content in a database and the apparatus may perform one or more operations to assist the user with writing their story based upon the searching of the database. The processing circuitry may use the inputted words to locate stored content of the database which may correspond to or be associated with the inputted words. In one specific embodiment, the processing circuitry may use the words to add graphical content to the respective pages of the story which include the words. For example, the database may include a plurality of graphical images of different characters (e.g., boys, girls, animals, etc.) and the inputted words may be used to search the database to select one or more of the graphical images to be inserted into the story.

In one more specific example, the inputted words 50 (e.g., "Sassy Sara") may refer to subject matter content which was previously created and stored in the database (e.g., a character named "Sara") and the inputted words 50 may be used by the processing circuitry to search and locate a graphical image 52 which corresponds to the inputted character name of "Sara." The graphical image 52 for "Sara" may be provided on the same page as the words 50 in one possible implementation.

In one embodiment, the database which the inputted words are searched against may include existing common names. If the user had not yet created a character for "Sara," the processing circuitry may query the user whether they wish to create a character, and if so, return to the screen of FIG. 3E so the user may input characteristics for "Sara." A graphical image 52 of Sara may be included on the page with the inputted words 50 once the graphical image 52 is created by a user.

In some situations, the apparatus may not be able to ascertain the user's intentions with respect to one or more inputted words and the apparatus may present additional queries to the user to clarify their intentions. For example, a name for a character inputted by the user may not be recognized by the apparatus and the apparatus may present a series of queries which may aide the apparatus in understanding the user's intentions. In but one example, the apparatus may query the user as to whether an inputted word which is not recognized is a name of a character. If so, screen of FIG. 3E may be presented to the user to assist with creation of a character.

The processing circuitry may analyze the inputted words with respect to other criteria or characteristics in addition to names of characters. For example, the processing circuitry may analyze the inputted words with respect to entries of the database which may include emotions, actions, colors, and descriptions of the environment of a character in some examples. As the user continues to input words, the words may be searched against the database and the graphical image 52 may be modified according to appropriate entries in the database corresponding to the words. Words matching one or more entries in the databases may be used to specify or alter one or more portions of a graphical image 52 of a character.

In the described example of the screen of FIG. 3G, the user has labeled the character "Sara" as sassy. In one embodiment, the user may name the character "Sassy Sara" and the graphical image 52 for "Sassy Sara" may be retrieved from the database and inserted into the page.

In another example, the character may be named "Sara" and the processing circuitry may retrieve the graphical image 52 for "Sara" from the database. The database may also include an entry for "sassy" which may be used to modify the stored graphical image of the character for Sara to include a sassy expression (i.e., the database entry for sassy may specify changes to a graphical image to include a sassy expression). Accordingly, in one embodiment, the same character may be depicted in different pages of the story as different graphical images having different characteristics as specified by the words inputted by the user. In another embodiment, different pages of the story may include different graphical images of different characters according to the inputted words of the respective pages of the story.

In one embodiment described above, the databases include a plurality of entries which include graphical images and/or modifications to graphical images In addition, each database entry may be associated with a searched term which is used for comparison with respect to words inputted by the user during the generation of their story. When an inputted word matches an entry, a page of the story being created may be modified. For example, an inputted word (e.g., name of the character) may be compared against a database and the page including the word may be modified to include the graphical image of the character of the entry as a result of the search term of the entry matching the word inputted by the user.

As mentioned above, the database may include emotions (e.g., sassy) which may be used to modify the graphical images depicted in the stories. Other emotions may be providing the in the database such as happiness, sadness, anger, etc. which result in corresponding modifications to the graphical image when the emotions are detected in inputted words in one embodiment.

As mentioned above, the database may also include actions which may be used to modify the graphical images. In one action example, an entry for the word "danced" may be located in the database and a graphical modification of the entry may be used to instruct the processing circuitry to modify the character to be shown as dancing. Other actions of the database may have stored image modifications which may be used to alter graphical images of characters when the words of the actions are entered by a user, such as running, jumping, etc.

Colors may also be contained as entries in the database and words of colors inputted by the user may be used to change colors of the graphical image.

Furthermore, entries of the database may include changes to the environment of the characters in one embodiment. In the illustrated example, the word "grass" may be searched against a database to locate a respective stored entry which specifies the processing circuitry to show the character in grass. Other descriptive words of the environment and the respective modifications to the graphical images associated with the words may also be stored in the database and used to alter the graphical images. In yet another example, if the user types "Matilda jumped over the fence with a smile on her face," then a graphical image of the character Matilda would appear on the page with the text and the graphical image of the character would be modified to be shown with a smile and jumping over a fence.

The inputted words and synonyms of the inputted words may be used to search the entries of the database in one embodiment. In addition, entries in the databases which include graphical images or specify modifications to the graphical images may be individually associated with a plurality of search terms. In one example, an entry specifying modification to a graphical image to show a character as frowning may be associated with synonymous search terms including "sadness" or "unhappiness" which may searched against using words inputted by a user.

A user may select the "next" button 54 when they are completed with the current page to move to another page or to perform other operations. The page created by the user is saved when the user selects the button 54.

In one embodiment discussed above, the processing circuitry of the story generation apparatus 10 monitors the words being inputted by the user onto a page to determine whether a graphical image should also be displayed on the page with the words. As discussed above, the processing circuitry may compare the inputted words against a database of names, emotions, actions, colors, environmental characteristics, etc. to determine whether the user has inputted the name of a character whereupon the processing circuitry may select and include a graphical image of the character on the page. The processing circuitry may monitor the other inputted words and modify the graphical image depicted on the page according to the words (e.g., modify the graphical image to show the inputted emotions, actions, colors, environment etc.) in the described embodiment.

In one embodiment, the processing circuitry of the story generation apparatus performs the monitoring of the inputted words, the selection and/or the modification of graphical images, and the insertion of the graphical images into pages of the story automatically and in the absence of user input which instructs the apparatus to perform the monitoring of words, the selecting or modifying of the graphical images, or the insertion of the graphical images into pages. Accordingly, in one embodiment, the operations performed by the story generation apparatus with respect to the addition of graphical images to stories being written by users are transparent to the users and the graphical images automatically appear on the pages with the inputted words in one embodiment.

The user may interact with a plurality of the screens of FIG. 3G to write a plurality of pages of the story and which may be individually saved and revised. Once the user has completed creating the desired pages, the user may instruct the apparatus 10 to finish the story. In one embodiment, the entire story may be saved once the user has indicated the story is finished. In another embodiment, the story may also be periodically automatically saved or backed-up without user instruction to save the work product being authored on a continuous basis and all work product may also be automatically saved without user instruction if the user exits the story generation application.

Users may revise previously created pages in one embodiment. For example, the user may change the text of a page, and the apparatus may modify the graphical image of the character of the page to correspond to the new text (if modifications are appropriate by the new text). The alterations to the graphical image may be performed automatically without user input instructing the modifications to be made in one embodiment.

Furthermore, upon completion of a story, the user may be asked whether they wish to review the story. If so, the story generation apparatus 10 displays the story to the user by starting with the title page and continuing through each of the pages. In one arrangement, the apparatus may also read the story to the user using a computerized narrator arranged to translate text into spoken words.

The user may also be asked by the story generation apparatus whether they wish to publish the story. If so, the apparatus may control a printer to print a hard copy of the story which was written by the user.

According to an additional embodiment, the story generation apparatus may be utilized in a school and also associated with a plurality of additional story generation apparatuses which are associated with other schools. The stories written by the users of one school may be submitted (e.g., via the Internet) to a web site. In one embodiment, the stories submitted to the web site may be compared with one another in a competition to identify the best stories. Proceeds for a winner may be used to establish a college fund for the winning student in one example.

The story generation apparatus may also be configured to operate in multiple languages in one embodiment so the apparatuses of the disclosure may be utilized in other counties throughout the world. In another embodiment, the apparatus may implement spell checking features. For example, if a user misspells a word, the apparatus may highlight the word, and display words from its databases which are similar to the typed word. The user may select one of the proposed words or enter a new spelling in possible embodiments.

Referring to FIG. 4, one method is shown of generating a graphical image using words inputted by a user according to one embodiment. The depicted method may be performed by processing circuitry of the story generation apparatus in one implementation. Other methods are possible including more, less and/or alternative acts.

At an act A10, the processing circuitry may monitor words which were inputted by the user during the writing of a page of the story by the user.

At an act A12, the inputted words may be compared to a database which includes a plurality of entries. Individual entries may include a graphical image or a modification of a graphical image and one or more search terms. The inputted words may be compared with the search terms of the entries to determine if any of the entries correspond to the inputted words. In one embodiment, the processing circuitry may also determine synonyms of the inputted words and compare the synonyms of the inputted words against the search terms of the entries.

At an act A14, the processing circuitry matches an inputted word with an entry of the database which specifies the creation of a graphical image. For example, the user may input a character's name which matches an entry of the database for the character. The processing circuitry may access the graphical image for the character from the appropriate entry of the database and modify the page written by the user to include the graphical image of the character.

At an act A16, the processing circuitry modifies the graphical image according to another of the inputted words matching an entry of the databases which specifies a modification to the accessed graphical image. For example, if the inputted word is "smiling," then the graphical image of the character may be modified to be shown as smiling. More than one modification may be made to the graphical representation according to the words inputted by the user.

At an act A18, the graphical image is inserted into the page of the story which includes the respective words which were inputted by the user.

In one embodiment, the acts of the method of FIG. 4 may be performed automatically by the processing circuitry as a result of the user inputting words to a page of the story and in the absence of instructions from the user which instruct the processing circuitry to perform the described acts.

At least some aspects of the disclosure provide apparatus and methods which assist users (e.g., children) with writing stories as well as helping the users understand their language. Some aspects of the disclosure assist users with creation of printable story books which are unique to the imagination of the users. At least some aspects of the disclosure augment the entered text of the story with graphical images which correspond to the text of the stories which was inputted by the users. As described above according to one embodiment, as the users type the stories, graphical images corresponding to the inputted text may be automatically generated in pages of the story and/or modified (i.e., in the absence of user inputs pertaining to the graphical images). Changes to the inputted words may automatically cause the graphical images to modified according to the changes of the words in one embodiment. Accordingly, in one embodiment, users can observe the results of their use of different words upon the graphical images which will aid the users to understand the meaning of the words.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A story generation method comprising:
   displaying a user interface which is configured to assist a user with writing a story;
   accessing a plurality of words of the story inputted by the user interacting with the user interface;

using at least one of the words of the story, selecting one of a plurality of different graphical images which corresponds to the at least one word of the story;

generating a plurality of pages of the story which include the words of the story, and wherein the generating one of the pages comprises generating the one of the pages to include the one graphical image which corresponds to the at least one word of the story which was inputted by the user at a first moment in time;

after the generating the one of the pages to include the one graphical image, changing the one graphical image on the one of the pages as a result of another of the words of the story being inputted by the user at a second moment in time after the first moment in time;

wherein the at least one word is a name of a character of the story and the one graphical image comprises different representations of the character of the story corresponding to respective ones of the at least one word of the story and the another of the words of the story; and wherein the another of the words of the story specifies a characteristic of the one graphical image of the character, and the changing the one graphical image of the character comprises changing according to the specified characteristic, and the user can revise the specified characteristic after the changing and reviewing the one graphical image of the character.

2. The method of claim 1 further comprising, using the name of the character, searching a database comprising the graphical images, and the selecting comprises selecting as a result of the name of the character matching one of a plurality of entries of the database, and wherein the one entry of the database comprises the one graphical image.

3. The method of claim 1 wherein the changing is automatically performed by processing circuitry in the absence of user input which instructs the changing, and further comprising automatically inserting the one graphical image into the one of the pages of the story in the absence of user input which instructs the insertion.

4. The method of claim 1, before the selecting, further comprising:
presenting a query regarding the character to the user;
accessing a response from the user which corresponds to the query; and
generating the one graphical image of the character in accordance with the response.

5. The method of claim 1 wherein the generating comprises generating the one of the pages of the story to include the one graphical image, the at least one word, and the another of the words of the story.

6. The method of claim 1 further comprising inputting the another of the words in the absence of any query presented by the user interface to the user.

7. The method of claim 1 wherein the changing comprises changing a facial expression of the character.

8. A story generation apparatus comprising:
a display configured to depict an interactive user interface which is configured to assist a user with writing a story;
processing circuitry configured to:
access a plurality of words of the story inputted by the user interacting with the user interface;
use at least one of the words of the story to select one of a plurality of different graphical images which corresponds to the at least one word of the story;
generate a plurality of pages of the story which include the words of the story, and wherein the generating one of the pages comprises generating the one of the pages to include the one graphical image which corresponds to the at least one word of the story which was inputted by the user at a first moment in time; and
after the generating the one of the pages to include the one graphical image, change the one graphical image on the one of the pages as a result of another of the words of the story being inputted by the user at a second moment in time after the first moment in time;
wherein the at least one word is a name of a character of the story and the one graphical image comprises different representations of the character of the story corresponding to respective ones of the at least one word of the story and the another of the words of the story; and
wherein the another of the words of the story specifies a characteristic of the one graphical image of the character, and the changing the one graphical image of the character comprises changing according to the specified characteristic, and the user can revise the specified characteristic after the changing and reviewing the one graphical image of the character.

9. An article of manufacture comprising:
at least one computer-readable non-transitory storage medium comprising programming stored thereon that is configured to cause processing circuitry to perform processing comprising:
controlling a display to depict an interactive user interface which is configured to assist a user with writing a story;
accessing a plurality of words of the story inputted by the user interacting with the user interface;
using at least one of the words of the story, selecting one of a plurality of different graphical images which corresponds to the at least one word of the story;
generating a plurality of pages of the story which include the words of the story, and wherein the generating one of the pages comprises generating the one of the pages to include the one graphical image which corresponds to the at least one word of the story which was inputted by the user at a first moment in time; and
after the generating the one of the pages to include the one graphical image, changing the one graphical image on the one of the pages as a result of another of the words of the story being inputted by the user at a second moment in time after the first moment in time;
wherein the at least one word is a name of a character of the story and the one graphical image comprises different representations of the character of the story corresponding to respective ones of the at least one word of the story and the another of the words of the story; and
wherein the another of the words of the story specifies a characteristic of the one graphical image of the character, and the changing the one graphical image of the character comprises changing according to the specified characteristic, and the user can revise the specified characteristic after the changing and reviewing the one graphical image of the character.

10. The article of claim 9 wherein the selecting comprises selecting the graphical image which corresponds to the character.

* * * * *